United States Patent

Lammers et al.

[11] Patent Number: 5,952,581
[45] Date of Patent: Sep. 14, 1999

[54] APPARATUS FOR TESTING THE DAMPING FORCE OF VIBRATION DAMPERS

[75] Inventors: Klemens Lammers, Bad Neuenahr; Winfried Günther, Andernach; Herbert Bies, Vettelhoven, all of Germany

[73] Assignee: Mannesmann Sachs AG, Eitorf, Germany

[21] Appl. No.: 09/102,864

[22] Filed: Jun. 23, 1998

[30] Foreign Application Priority Data

Jun. 24, 1997 [DE] Germany .................. 197 26 769

[51] Int. Cl.[6] ......................................... G01N 3/08
[52] U.S. Cl. .................. 73/831; 73/856; 73/781; 73/650
[58] Field of Search .............. 73/760, 763, 781, 73/774, 831, 833, 853, 856, 430, 11.05, 857, 650, 805, 814

[56] References Cited

U.S. PATENT DOCUMENTS

| | | |
|---|---|---|
| 3,693,402 | 9/1972 | Jones ............................................ 73/11 |
| 3,961,525 | 6/1976 | Himmler ....................................... 73/91 |
| 4,478,086 | 10/1984 | Gram ......................................... 73/781 |
| 5,095,757 | 3/1992 | Larsen et al. ............................... 73/857 |
| 5,271,279 | 12/1993 | Serra-Tosio et al. ...................... 73/856 |
| 5,426,276 | 6/1995 | Gram et al. ................................. 73/856 |
| 5,431,060 | 7/1995 | Lauren ....................................... 73/831 |

Primary Examiner—Hezron Williams
Assistant Examiner—Helen C. Kwok
Attorney, Agent, or Firm—Cohen, Pontani, Lieberman & Pavane

[57] ABSTRACT

An apparatus for testing the damping force of vibration dampers includes a frame, a drive and a clamping device for receiving the vibration dampers. One part of the clamping device is fixed in place and the other part is axially movable. The axially movable part of the clamping device is connected to the drive with a force transducer and a drive element. The drive is controlled by a control system.

10 Claims, 2 Drawing Sheets

APPARATUS FOR TESTING THE DAMPING FORCE OF VIBRATION DAMPERS

BACKGROUND OF THE INVENTION

1. Field of the Invention

The invention relates to an apparatus for testing the damping force of vibration dampers. The apparatus includes a frame, a drive and a clamping device for receiving the vibration dampers. One part of the clamping device is fixed in place and another part of the clamping device is axially movable.

2. Description of the Related Art

One type of prior art apparatus for testing the damping force of vibration dampers include apparatus having a servo hydraulic control basis. This type of vibration damper testing device has advantages with respect to setting variable speeds and variable strokes and also with respect to automation. However, the prior art hydraulic control test apparatus require high investment funds, a considerable amount of upkeep and a considerable amount of maintenance effort. Another disadvantage is these hydraulic control apparatus is that they require a large space and necessary environmental protection measures, such as trays to catch any hydraulic oil.

Another type of prior art apparatus for testing the damping force of vibration dampers includes those designed as crank-operated test stands. These prior art crank-operated test apparatus are inflexible with respect to adjustment of the stroke and speed. Another disadvantage is that it is rarely possible to install a crank-operated apparatus inexpensively as an automatic station in a transfer installation.

SUMMARY OF THE INVENTION

The object of the present invention is to provide an apparatus for testing the damping force of vibration dampers which is of a simple construction, occupies a small space and/or has a small capital investment requirement and is easily integrated into an automatic transfer line.

To achieve this object, it is provided according to the present invention that an axially movable part of the clamping device is connected to a drive via at least one force transducer and a drive element. The drive is controlled by a controller or control system.

A ball screw is advantageously provided as the drive element. The ball screw has a stepless and variable testing stroke adjustment within a predetermined range. In addition, the testing speed may also be adjusted in a stepless and variable manner within a predetermined range using the ball screw.

According to a further embodiment, a bevel gearing or a worm gearing may also be provided as the drive element. These types of drives may be used instead of the ball screw.

A simple embodiment in terms of production engineering includes a threaded spindle of the ball screw connected to the drive. The threaded spindle is connected directly to the drive without a further element interposed therebetween. The drive may comprise an electric motor which, depending on activation, runs in clockwise or counterclockwise rotations.

According to yet another embodiment, the control system is controlled by a computer. It is advantageously provided that the parameters comprising number of strokes, testing displacement and speed are varied by the control system. These parameters are readily executable by the electric drive under the control of a computer. Since the threaded spindle acts directly on the drive element, an axial movement of the upper clamping device is executed by clockwise or counterclockwise rotation of the threaded spindle.

For determining the testing force, between the upper clamping device and the drive element of the ball screw, a force transducer which, according to a particularly favorable embodiment, includes a compression sensor and tension sensor. It has proved to be particularly advantageous here for the force transducer to also include strain gages.

When the apparatus for testing the damping force of vibration dampers has been integrated into an automatic transfer line, the clamping device may be provided with a magnet. The test objects, or vibration dampers, are placed automatically in the clamping device and are subsequently held by applying a magnetic force to the vibration damper, preferably until the clamping device has fixed the vibration damper in a test position.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 1a is a front view of an apparatus for testing the damping force of vibration dampers according to an embodiment of the present invention;

FIG. 1b is a side view of the apparatus shown in FIG. 1a; and

DETAILED DESCRIPTION OF THE PRESENTLY PREFERRED EMBODIMENTS

Figures 1A, 1B:
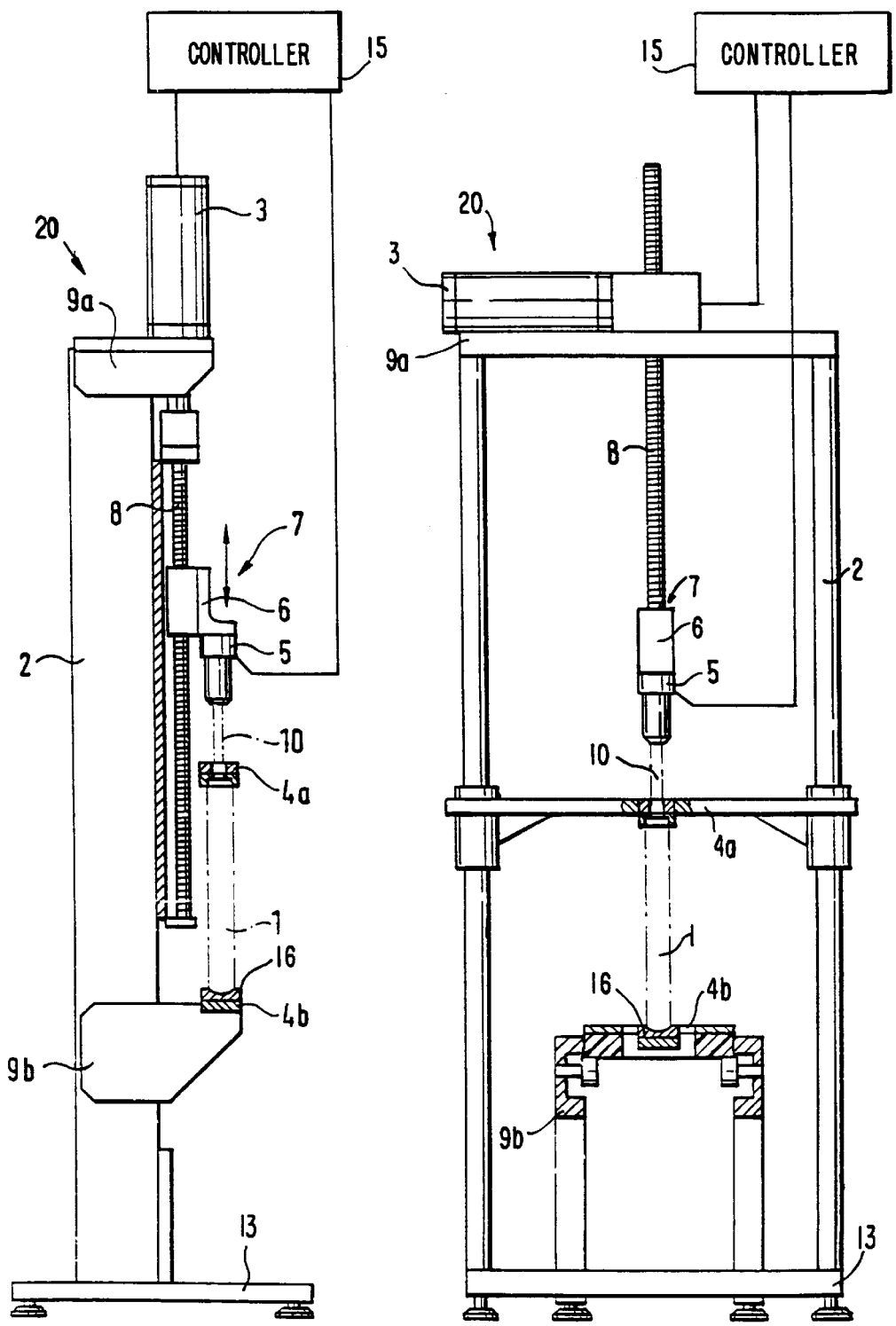

FIGS. 1a and 1b show an apparatus 20 for testing the damping force of vibration dampers substantially including a frame 2 arranged on a base 13 having an upper bracket 9a and a lower bracket 9b. An upper clamping device 4a and a lower clamping device 4b are mounted between the upper and lower brackets 9a and 9b. The upper and lower clamping devices 4a and 4b grip a first part of a vibration damper 1 to be tested. A piston rod 10 of the vibration damper 1 is received in a force transducer 5. The force transducer 5 is connected directly to a drive element 6, which is a part of a drive device 7. A threaded spindle 8 of the drive device 7 passes through the upper bracket 9a and is directly connected to a drive 3. The drive rotates the threaded spindle 8 of the drive device 7 in a clockwise or a counterclockwise direction, so that the drive element 6 moves axially along the threaded spindle 8.

The drive 3 is activated by a controller 15. The controller 15 implements specific testing cycles to be performed and may comprise a computer. The testing cycle corresponds to the respective activation and varies according to requirements of the test parameters comprising number of strokes, testing displacement and speed of the strokes, which are subsequently recorded correspondingly. The correspondingly achieved damping force in the vibration damper 1 is determined by the force transducer 5 and is likewise transmitted to the controller 15. The controller 15 may then classify the vibration dampers 1 as usable or unusable based on predetermined threshold values or allowable damping force values.

When the apparatus 20 is integrated into an automatic transfer line, the clamping device 4a may include a magnet 16. The test objects, or vibration dampers 1, are placed automatically in the lower clamping device 4b and are subsequently held by applying a magnetic force to the vibration damper 1 using the magnet 16, preferably until the upper clamping device 4a has fixed the vibration damper 1 in a test position.

Figure 2:
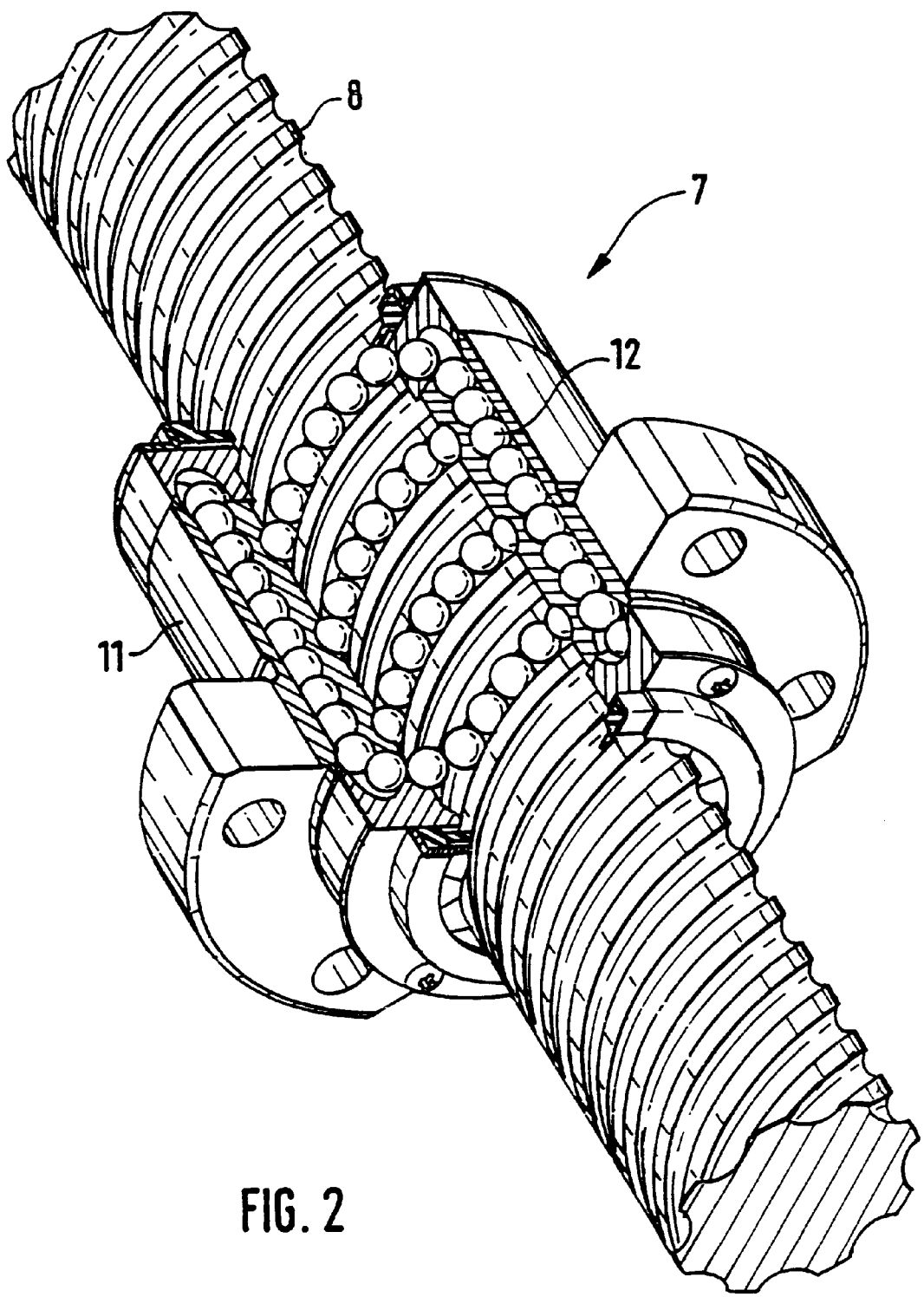
FIG. 2 is a partially cutaway perspective view showing a ball screw of the apparatus of FIGS. 1a and 1b.

FIG. 2 is a detailed perspective view of the drive device 7 comprising a ball screw drive device. The threaded spindle 8 includes a rolled threaded part. A ball-screw threaded nut 11 receives ball bearings 12 in corresponding tracks. The ball bearings 12 are held between the tracks of the ball-screw threaded nut and the threads of the threaded spindle 8. When the threaded spindle 8 is rotated by the drive 3 (not shown in FIG. 2), the ball-screw threaded nut 11 is held rotatably fixed and is moved axially with respect to the threaded spindle 8. The drive element 6 and the force transducer 5 shown in FIGS. 1a and 1b are connected with the ball-screw threaded nut 11. Instead of using a ball screw drive device as shown in FIG. 2, the drive device 7 may also comprise a bevel gearing device or a worm gearing device.

The invention is not limited by the embodiments described above which are presented as examples only but can be modified in various ways within the scope of protection defined by the appended patent claims.

We claim:

1. An apparatus for testing a damping force of a vibration damper having a first part and a second part, the first part being axially movable with respect to the second part, said apparatus comprising:

a frame;

a clamping device mounted within said frame having a fixed first clamping part for fixedly receiving one end of the first part of the vibration damper and a movable second clamping part for receiving the other end of the first part of the vibration damper;

a force transducer and a drive element connectable to the second part of the vibration damper such that said force transducer is positioned between said drive element and said second part of said clamping device, said force transducer generating an output signal in response to a force applied by said drive element to the second part of the vibration damper via said force transducer;

a drive connected to said drive element for driving said drive element in an axial direction with respect to a position of the vibration damper in said clamping device such that said drive element, said force tranducer and the second part of the vibration damper are movable relative to the first part of the vibration damper and said first and second clamping parts of said clamping device; and a controller for controlling said drive.

2. The apparatus of claim 1, wherein said drive element comprises a ball screw drive device.

3. The apparatus of claim 1, wherein said drive element comprises a bevel gearing.

4. The apparatus of claim 1, wherein said drive element comprises a worm gearing.

5. The apparatus of claim 2, wherein said ball screw drive device comprises a threaded spindle rotatably connected to said drive.

6. The apparatus of claim 1, wherein said controller comprises a computer.

7. The apparatus of claim 6, wherein said controller controls test parameters comprising a number of strokes, a displacement of the strokes, and a speed of the strokes via control of said drive.

8. The apparatus of claim 1, wherein said force transducer comprises a compression sensor and tension sensor.

9. The apparatus of claim 8, wherein said force transducer further comprises strain gages.

10. The apparatus of claim 1, wherein said clamping device comprises a magnet for receiving the vibration damper and magnetically holding the vibration damper until the vibration damper is fixedly held by said clamping device.

* * * * *